(No Model.)
G. W. BROWN.
LUBRICATOR.
No. 426,764. Patented Apr. 29, 1890.
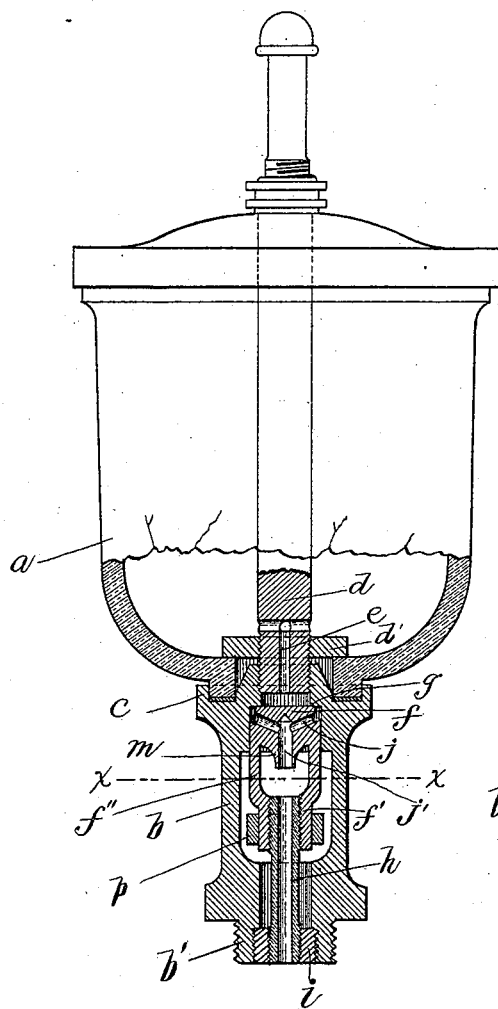
WITNESSES:
INVENTOR:

UNITED STATES PATENT OFFICE.

GILMAN WELD BROWN, OF WEST NEWBURY, MASSACHUSETTS.

LUBRICATOR.

SPECIFICATION forming part of Letters Patent No. 426,764, dated April 29, 1890.

Application filed June 10, 1889. Renewed March 28, 1890. Serial No. 345,634. (No model.)

*To all whom it may concern:*

Be it known that I, GILMAN WELD BROWN, of West Newbury, in the county of Essex and State of Massachusetts, have invented certain new and useful Improvements in Lubricators, of which the following is a specification.

This invention relates to automatic lubricators for bearings of shafting, &c.; and it has for its object to provide improved means whereby variations in the temperature of the bearings are caused to regulate the supply of oil to the bearing, so that in case the bearing becomes unduly heated an increased supply of oil will be automatically afforded.

The invention consists in the improvements which I will now proceed to describe and claim.

In the accompanying drawings, forming a part of this specification, Figure 1 represents a vertical section of my improved lubricator. Fig. 2 represents a section on line $x\,x$ of Fig. 1.

The same letters of reference indicate the same parts in all the figures.

In the drawings, $a$ represents an oil cup or reservoir composed of glass or other suitable material.

$b$ represents a metallic shank located under the reservoir $a$ and constituting the support thereof, said shank being provided with a screw-threaded lower end $b'$, adapted to be attached to the shaft-bearing. The upper end of the shank $b$ may be attached in any suitable way to the cup or reservoir $a$, the preferred connection being that here shown— namely, a flange $c$ on the shank engaging a shoulder on the bottom of the reservoir, the latter having an aperture, into which the upper end of the shank projects. Within the reservoir is a vertical rod or stem $d$, the lower end of which is screw-threaded and screwed into a tapped socket in the upper end of the shank, said rod having a flange or collar $d'$, which presses upon the entire surface of the cup around the margin of the aperture in the bottom thereof, the cup being thus clamped between the flanges $c$ and $d'$.

In the lower portion of the rod $d$ is formed an outlet-passage $e$, through which oil escapes from the reservoir.

$f$ represents a valve located within the shank $b$ and arranged to close against a seat $g$, formed within said shank, and thus prevent the flow of oil from the reservoir, oil being permitted to flow when the valve is separated from said seat. The valve is supported by a standard $h$, which is preferably of tubular form and serves as a conduit for the oil that passes the valve. The standard $h$ is made of different metal from that of which the cup support or shank $b$ is made, said standard and shank having different coefficients of expansion. The shank $b$ is preferably made of brass, while the standard $h$ is of iron or some other metal whose rate of expansion and contraction is less than that of the metal of shank $b$. The standard $h$ is supported by being attached at its lower end to a bushing $i$, inserted in the lower end of the shank $b$. It will be seen that when the temperature of the bearing is increased beyond a predetermined or normal point the cup-supporting shank $b$, expanding more rapidly than the valve-supporting standard $h$, causes a sufficient separation of the seat $g$ from the valve $f$ to increase the flow of oil beyond the ordinary or normal flow for which the valve is adjusted, and thereby cause an increased lubrication, which will decrease the temperature, whereupon the contraction of the brass composing the shank $b$ will restore the valve and seat to their normal relation to each other. It will be observed that the parts whereby this automatic regulation is produced are located entirely below the oil-reservoir, so that the oil does not require to be heated before the increased supply can be afforded to the bearing.

I am aware that it is not new to cause the separation of a valve from its seat in a lubricator by an increase of temperature of the bearing with which the lubricator is connected. In Letters Patent No. 382,752, granted to me May 15, 1888, a valve is shown which is supported by a thermostatic or compound bar, the parts of which have different rates of expansion, so that the bar is bent or deflected by an increase in the temperature of the bearing, and is thereby caused to separate the valve and its seat. In the present instance, however, I do not employ a thermostatic or compound bar, but make the support $b$ for the cup in one piece or of one metal, and the support $h$ for the valve of another metal, thus simplifying the construction as compared with that shown in my former patents. I am aware, however, that it has been proposed to produce a result similar to that herein described by the unequal expansion of a cup having a valve-seat and a valve support or stem made of a different metal from the cup, as shown in Letters Patent No. 360,243 to Patrick. My present invention differs, however, from that shown in the Patrick patent, in that the parts which produce the automatic regulation of the flow of oil are entirely outside of the cup or oil-reservoir and do not require the heating of the oil as a condition necessary to their operation, while in the construction shown in said patent the entire cup and the oil therein must be heated before an increased opening can be created to afford an increased supply of oil. The advantages of my arrangement will therefore be apparent.

The valve $f$ is preferably provided with channels $j j'$ for the passage of the oil through the valve. The channel $j'$ extends through the body of the valve and terminates in a conical or frusto-conical projection $m$ on the lower side of the valve. Said projection coincides with the sight-openings in the sides of the shank $b$, so that the oil passing through the valve can be seen as it drips from the passage $j'$, said passage being located exactly over the tubular standard $h$, which supports the valve, so that the oil drops into said tubular standard and flows therethrough to the bearing. The oil in flowing through the tubular standard $h$ keeps the temperature of the oil from rising as high as that of the valve-support $b$, and therefore increases the sensitiveness of the device. The valve is connected with the tubular standard $h$ of an internally-threaded collar $f$, which is screwed upon the threaded upper end of the standard $h$, and is connected with the body of the valve by bars $f^2$, constituting an open cage, through which the passage of the oil can be readily observed.

The extent of the opening of the valve by the thermo-dynamic action above described may be regulated by turning the collar $f'$ upon the standard $h$, so as to raise or lower the valve, and thereby decrease or increase the opening formed between the valve and its seat by the expansion of the standard $b$. To permit this adjustment of the valve, I provide the collar $f'$ with a ring $p$, having an arm or handle $q$, which projects through one of the said openings in the standard $b$. The ring $p$ is adjustably secured to the collar $f'$, so that when it is rotated by the handle $q$ the collar $f'$ is turned, and the valve is thereby raised or lowered, as the case may be. The handle $q$ abuts against the side opening in the standard $b$, through which it projects when moved to one extreme or the other of this movement, said sides constituting stops to limit the rotation of the valve in either direction.

I do not limit myself to the details of construction shown herein, as the same may be variously modified without departing from the spirit of my invention. For example, the valve-support $h$ may be other than of tubular form, and may be outside the cup-support $b$, instead of within the same.

Various other changes may be made, such as would naturally suggest themselves to a skilled mechanic.

I claim—

1. The combination of an oil cup or reservoir and a combined supporting and automatic oil-feed-regulating device therefor, the same consisting of a vertically-arranged metallic shank having an oil-conduit and a valve-seat and secured at its upper end to the lower portion of the oil-cup, a valve adapted to cooperate with said seat in regulating the flow of oil through said conduit, and a vertically-arranged metallic standard supporting said valve, composed of a metal having a different coefficient of expansion from that of the shank, said shank and standard being arranged to expand and contract vertically at different rates, and thereby regulate the width of the oil-passage between the said valve and seat, as set forth.

2. The combination of an oil cup or reservoir, a vertically expanding and contracting metallic shank secured to the bottom thereof and provided with one or more sight-openings, a valve within the shank, adapted to control the discharge of oil and provided with an oil-discharge passage terminating in a depression on the lower side of the valve, said depression coinciding with the sight opening or openings, and a vertically expanding and contracting support for the valve, composed of a metal whose coefficient of expansion differs from that of the reservoir-support, as set forth.

3. The combination of an oil-reservoir, a vertically expanding and contracting metallic shank supporting the same, a valve within the shank, adapted to control the discharge of oil from the reservoir, said valve having a screw-threaded collar, and a vertically expanding and contracting standard, as $h$, composed of a metal having a different coefficient of expansion from that of the reservoir-support, and having a screw-thread engaged with the threaded collar of the valve, whereby the rotation of said collar is caused to adjust the valve vertically, as set forth.

4. The combination of an oil-reservoir, a metallic shank supporting the same and provided with a side opening, a valve within the shank, having a screw-threaded collar, and an arm or handle projecting from said collar through the side opening, and a valve-supporting standard $h$, having a screw-thread engaged with the threaded collar of the valve, as set forth.

In testimony whereof I have signed my name to this specification, in the presence of two subscribing witnesses, this 22d day of January, A. D. 1889.

GILMAN WELD BROWN.

Witnesses:
C. F. BROWN,
A. D. HARRISON.